UNITED STATES PATENT OFFICE.

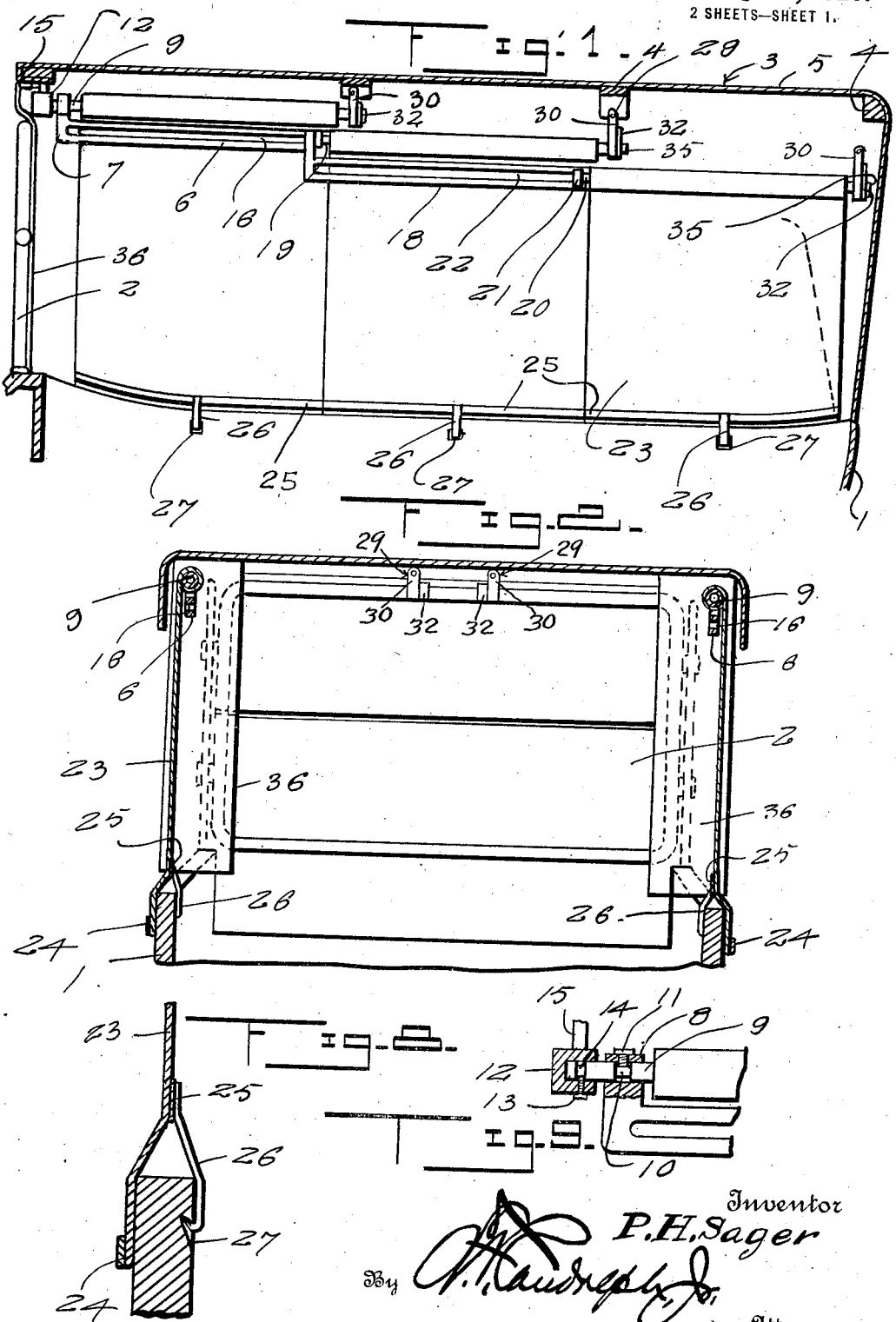

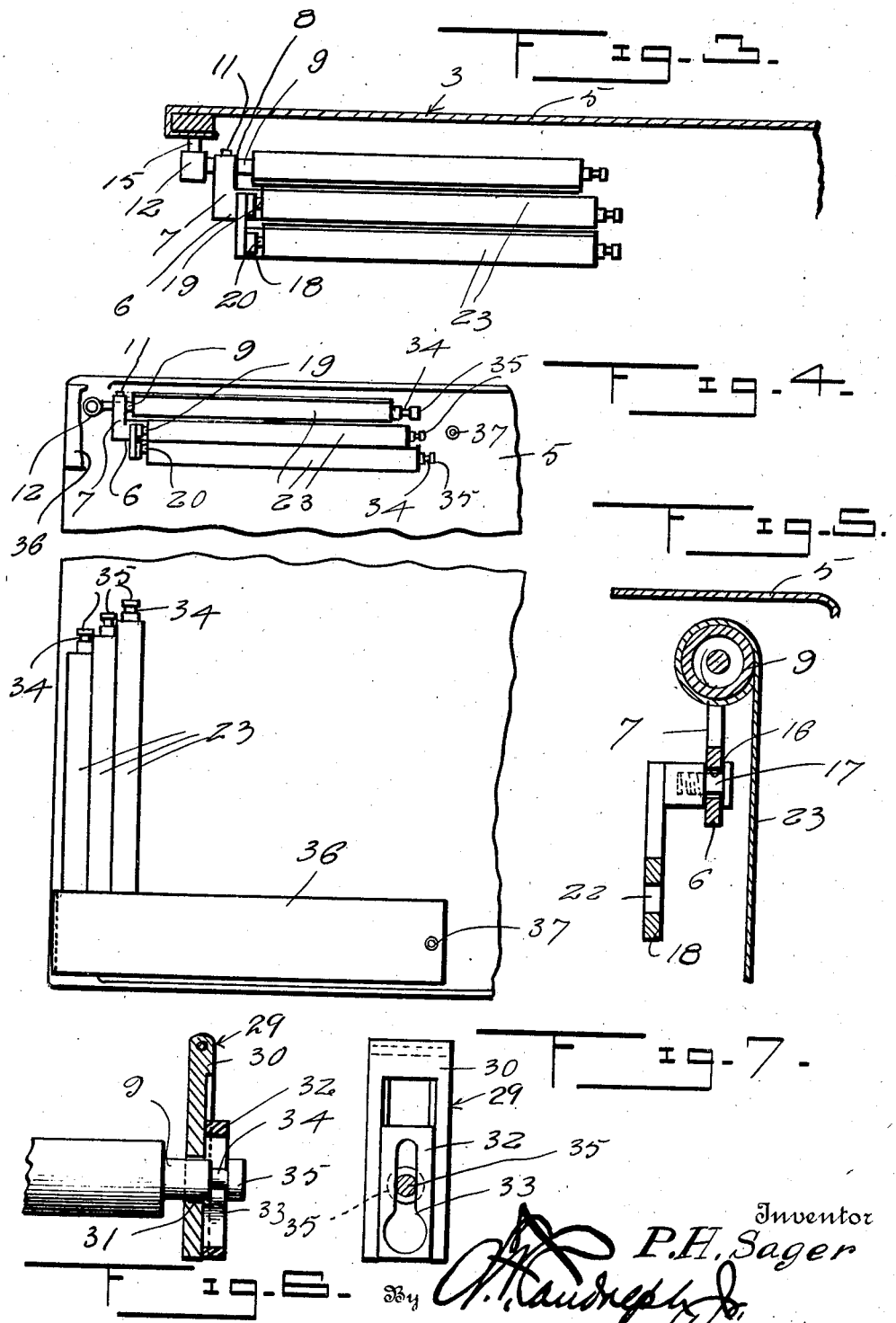

PETER H. SAGER, OF MARIANNA, FLORIDA.

ROLLER-CURTAIN FOR AUTOMOBILES.

1,351,403.  Specification of Letters Patent.  Patented Aug. 31, 1920.

Application filed September 3, 1918. Serial No. 252,406.

*To all whom it may concern:*

Be it known that I, PETER H. SAGER, a citizen of the United States, residing at Marianna, in the county of Jackson and State of Florida, have invented certain new and useful Improvements in Roller-Curtains for Automobiles; and I do hereby declare the following to be a full, clear, and exact description of the invention, such as will enable others skilled in the art to which it appertains to make and use the same.

This invention relates to improvements in curtains for automobiles, and has for one of its objects the provision of rollers carried by the top of the automobile and adapted to have the curtains wound thereon while not in use, and which curtains can be readily lowered for inclosing the automobile to protect the occupants from rain and the like without the operator getting out of the automobile.

Another object of this invention is the provision of means for supporting the rollers to the automobile top, so that they can be moved in close relation to each other and then swung across the front of the automobile adjacent the windshield out of the way and at such a position that they can be readily handled by the operator when desiring to extend the rollers along the side edges of the top prior to letting down the curtain.

A further object of this invention is the provision of a roller curtain for automobiles of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:

Figure 1 is a fragmentary vertical sectional view of a roller curtain for automobiles constructed in accordance with my invention, Fig. 2 is a fragmentary transverse sectional view of the same, Fig. 3 is a similar view, illustrating the curtain rolls swung in rear of the wind shield of the automobile ready to be swung upwardly in close proximity to the top, Fig. 4 is a fragmentary bottom plan view of the device, Fig. 5 is a transverse sectional view, illustrating the manner of mounting the rollers, Fig. 6 is a detail sectional view of a locking means, Fig. 7 is a front elevation, partly in section, of the same, Fig. 8 is a detail sectional view drawn on an enlarged scale, illustrating the manner of securing the curtains to the body of the automobile, and Fig. 9 is a detail sectional view, illustrating means of pivotally mounting the frame and support to the rollers.

Referring in detail to the drawing, the numeral 1 indicates the body of an automobile carrying the usual wind shield 2 and top 3. The top 3 is of the ordinary type employing the bows 4 for supporting the covering 5. The foregoing relates to a well known construction of automobile and to which my invention is applied.

In applying my invention to an automobile top, a set of rollers is connected to each of the forward corners of the top, and reference to one is thought sufficient for both. A frame 6 has formed upon one end an arm 7, provided with a bearing 8 adapted to receive one end of a roller 9. A portion of the roller 9 that is disposed within the bearing 8 is provided with a groove 10 to receive the inner end of a set screw 11, carried by the bearing 8, whereby the roller 9 is locked against endwise movement in relation to the bearing, but is free to rotate therein. The portion of the roller 9, which is disposed within the bearing 8, projects beyond the same and is journaled in a bearing 12. The bearing 12 is provided with a set screw 13 fitting within a groove 14 in the roller 9. The bearing 12 is pivotally connected to the top 3 of the automobile by a pivot member 15, so that the frame 6 can be swung to extend longitudinally or transversely of the body 1. When the frame 6 is swung transversely of the body 1, it is located in close proximity to the upper edge of the wind shield 2. The frame 6 is provided with longitudinally extending slots 16, which slidably receive the head 17 secured to a frame 18. The frame 18 is identical in construction with the frame 6, and has one end of a roller 19 journaled therein. A roller 20 is provided with a head 21, similar to the head 17, and is slidably received within the longitudinal slot 22 of the frame 18. When the device is in an operative position, as illustrated in Fig. 1, the rollers 9, 19 and 20 extend one beyond the other so as to position the roller 20 adjacent the rear end of the top. Each of the rollers has secured thereto a curtain 23, which is adapted to be rolled upon its respective roller when the device is not in use. When the device is in use and the rollers are in an extended position, as illustrated in Fig. 1, the curtains are lowered, so that they overlie the body 1, as illustrated in Fig. 8, and have secured to their lowermost edge strips or bars 24, which bear against the slides of the body 1. Bars or strips 25 are secured to the curtains 23, at a point above their lower edges and have connected thereto catches 26, adapted to engage notches 27 in the body 1, for the purpose of fastening the curtains in lowered position to prevent them from flapping while the automobile is in motion. Suitable straps (not shown) may be secured to the curtains 23 for the purpose of unwinding the same.

Supporting members 29 are connected to the bows 4 of the top 3 by means of a suitable pivot, and are adapted to support the free ends of the rollers 9, 19 and 20 when in an extended position. The supporting members 29 each consist of a plate 30, provided with an opening 31 to receive the free ends of the rollers, and has slidably mounted thereon a locking plate 32, provided with a keyhole slot 33. When desired to insert the free end of one of the rollers within one of the supporting members 29, the large portion of the keyhole slot 33 is moved into registration with the opening 31, permitting the free end of the roller to be inserted therein. The locking plate 32 is then slid downwardly, positioning the reduced portion 34 of the roller within the neck of the keyhole slot, thus locking the roller to the supporting member. Each of the rollers upon their free ends are provided with heads 35, so that they can be readily gripped for the purpose of winding the curtains onto the rollers when desired. In normal position the device is swung transversely to the top 3 in close proximity to the wind shield 2, and when in this position, the frames 6 and 18 are telescoped or slid in the direction of each other, as illustrated in Fig. 3. The set screw 11 is then released and the frame 6 is swung upwardly, carrying with the same the frame 18, and the roller 20, positioning the rollers all in a horizontal plane. The front portion of the top 3 is also provided with a supporting member 29 to receive the free end of the roller 9 to support the entire device along the upper edge of the wind shield.

Comparatively narrow curtains 36 are permanently secured to the front edge of the top 3 at each corner thereof and when the curtains 23 are unrolled and secured to the body, the curtains 36 are adapted to be lowered so as to close the space between the front curtain of the set of curtains 23 and the wind shield 2. The curtains 36 have secured to their free ends suitable fasteners 37, which are adapted to be connected to the top 3 in any well known manner for supporting the curtains in close proximity to the top when not in use. To lower the curtains 36 it is only necessary that the fasteners 37 be detached and the lower edges or free ends of the curtains secured to the body by a suitable catch.

While I have shown and described the preferred embodiment of my invention, it will be understood that minor changes in construction, combination and arrangement of parts may be made without departing from the spirit and scope of the invention as claimed.

Having thus described my invention, what I claim is:

1. A device of the character set forth including an automobile body and a top, a frame pivotally connected to the top, a roller carried by said frame, a second frame slidably connected to the first-named frame, a roller carried by the second frame, a roller slidably connected to the second-named frame, curtains wound on said rollers, means supporting the rollers and frame in an extended position when swung longitudinally of the top, and means for securing the free ends of the curtains to the body.

2. A device of the character set forth including an automobile body and a top, a bearing pivotally connected to the top, a roller having one end journaled in said bearing, a frame journaled to said roller adjacent its journaled end, a second frame slidably connected to the first-named frame, a roller journaled to the second-named frame, a roller slidably and rotatably connected to the second-named frame, curtains carried by said rollers, means supporting the free ends of the rollers when in extended position, and means for connecting the free ends of the curtains to the body.

3. A device of the character set forth including an automobile body and a top, a roller having one end rotatably and pivotally connected to the top, a frame having one end journaled to the roller, a second frame slidably connected to the first-named frame, a roller journaled to the second-named frame, a roller journaled and slidably connected to the second-named frame, curtains carried by said rollers, supporting means carried by the top and adapted to rotatably support the free ends of the rollers when the frames are in extended position and extending longitudinally of the top.

4. A device of the character set forth including an automobile body and a top, a roller pivotally connected to the top, a frame journaled to said roller, a second frame slidably connected to the first-named frame, a roller journaled to the second-named frame, a roller slidably and rotatably connected to the second-named frame, curtains for said rollers, plates pivoted to the top at spaced intervals and having openings to receive the free ends of the rollers, locking plates having keyhole slots carried by said plates and adapted to secure the free ends of the rollers of the first-named plates against endwise movement, and means securing the curtains to the body.

In testimony whereof I affix my signature in presence of two witnesses.

PETER H. SAGER.

Witnesses:
F. W. SELLERS,
WILLIAM LAFFERTY.